April 13, 1965
S. R. CAUSEY
3,178,618
ELECTRIC TERMINAL AND CONTROL BOX
Filed Nov. 20, 1959
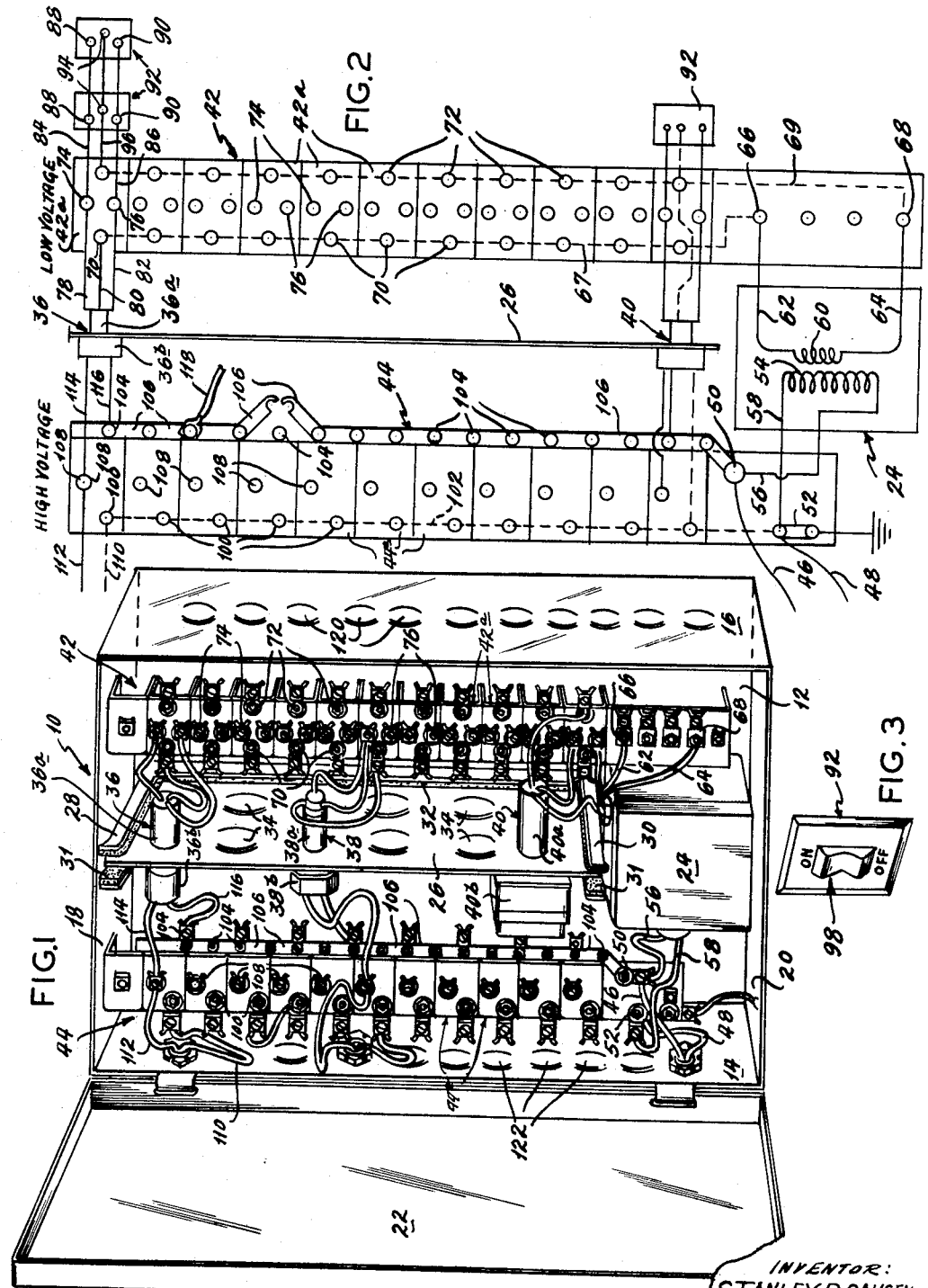
INVENTOR:
STANLEY R. CAUSEY
By Gravely, Lieder & Woodruff
ATTORNEYS.

United States Patent Office 3,178,618
Patented Apr. 13, 1965

3,178,618
ELECTRIC TERMINAL AND CONTROL BOX
Stanley R. Causey, Rte. 1, Box 60A, Irondale, Mo.
Filed Nov. 20, 1959, Ser. No. 854,337
2 Claims. (Cl. 317—99)

The present invention relates to boxes for electric control apparatus and more particularly to an electric terminal and control box for wiring systems such as home and factory wiring systems.

Various electric wiring boxes, junction boxes and like devices have been devised in the past including structures with both high and low voltage circuits coming into the same box. The known boxes, however, have employed taped connections, have not been arranged for easy separation and separate fusing of the various circuits, and have not provided an orderly arrangement of the connections for ease of testing and trouble shooting. Furthermore, the known devices have been noisy and have been subject to troubles caused by dampness. The present construction overcomes these and other disadvantages of the known constructions by providing a box for dual voltage electrical systems which provides an orderly and convenient arrangement of terminal connections, means separating the different voltages and different circuits, noise elimination means and means to minimize the harmful effects caused by dampness. The present invention also teaches the construction of an electric junction box which is relatively easy to construct, to inspect and to trouble shoot, and one which can be installed relatively easily and in minimum time. Furthermore, the present device can be connected to separate, and also to separately fuse various circuits; and the present device is safer to use than conventional equipment because it reduces to a minimum the amount of high voltage wiring.

It is therefore a principal object of the present invention to provide a junction box construction for dual voltage electric systems that is safer to use than known devices.

Another object is to simplify the wiring, testing, and trouble shooting of an electrical system.

Another object is to provide a junction box that is relatively easy and inexpensive to construct and install and one that can be expanded to accommodate a plurality of electrical circuits.

Another object is to reduce noise in an electric system.

Another object is to minimize the effects produced on an electrical system by moisture.

Another object is to minimize the time required to install an electrical system.

These and other objects and advantages of the present invention will become apparent after considering the following detailed specification in conjunction with the accompanying drawing, wherein:

FIG. 1 is a perspective view of an electric terminal and control box constructed according to the teachings of the present invention;

FIG. 2 is a schematic wiring diagram of the box of FIG. 1; and

FIG. 3 is an enlarged perspective view of a typical switch employed with the subject device.

Referring to the drawing by reference numbers, the number 10 in FIG. 1 refers to a terminal and control box for a dual voltage electrical system constructed according to the present invention. The box 10 has a rear wall 12, side walls 14 and 16, a top wall 18, a bottom wall 20, and a cover 22 hingedly attached to the forward edge of the side wall 14. It is also contemplated to substitute for the hinged cover 22, a cover that is attached by screws and which is completely removable. This is sometimes called a dead front construction and is preferred in some localities for safety reasons.

A step-down transformer 24 is mounted inside of the box 10 adjacent to the bottom wall 20, and the inside of the box 10 is divided into two compartments by an intermediate vertical divider wall 26. The wall 26 is slidably mounted in the box 10 in guide tracks 28 and 30, and the tracks are cushioned with rubber like material 31 to minimize noise and vibration. Also, rubber like material in the form of pads or a full length strip 32 is positioned on the rear wall 12 behind the rear edge of the wall 26.

The divider wall 26 has a plurality of spaced knockouts 34 therein. Any one or all of the knockouts 34 can be removed as needed for mounting relays on the wall 26. In FIG. 1 three such relays 36, 38 and 40 are shown. The relays 36, 38 and 40 are double acting relays, that is they have separate coils which control the movement of an armature (not shown). When one of the coils is energized, the armature moves in one direction and closes a set of relay contact points (not shown) and when the other coil is energized the armature moves in the opposite direction and opens the contact points.

In FIG. 1 the relays 36, 38 and 40 are shown with coil housing portions 36a, 38a and 40a, respectively, extending into the right box chamber, and contact housing portions 36b, 38b and 40b extending into the left box chamber.

The right chamber of the box is the low voltage chamber, as will be shown, and has connections to switches and other low voltage circuits located at various places throughout a house or factory. By tapping the secondary of the transformer it is also contemplated to provide means for connecting other low voltage output circuits at different voltage levels, as required. Terminals for these other low voltage circuits are provided in the low voltage compartment. The left chamber of the box is the high voltage chamber and has connections to equipment such as lamps, appliances, and the like, which are controlled by the aforesaid switches.

A low voltage terminal strip 42 is positioned in the right chamber and extends from adjacent to the top wall 18 to adjacent to the bottom wall 20. The strip 42 has a plurality of terminal connectors mounted thereon.

Similarly, a high voltage terminal strip 44 is positioned in the left chamber and extends from adjacent to the top wall 18 to adjacent to the bottom wall 20. The high terminal strip 44 also has a pulurality of electrical terminal connectors mounted thereon which will be described more fully hereinafter.

Power is fed to the box 10 on the high voltage side by input leads 46 and 48 which are connected to terminals 50 and 52 respectively. The terminals 50 and 52 are connected to primary winding 54 of the step-down transformer 24 by leads 56 and 58 respectively (FIG. 2). The secondary winding 60 of the transformer 24, has fewer turns than the primary 54 to step the voltage down, and is connected by leads 62 and 64 to the terminals 66 and 68 on the low voltage strip 42. The terminal 66 is connected by lead 67 to all of the terminals 70 on the low voltage terminal strip 42; and the terminal 68 is connected by lead 69 to all of the terminals 72 also on the low voltage terminal strip 42. A third centrally located row of terminals is also provided on the low voltage strip 42. The central row of terminals has two terminals for each corresponding terminal 70 and terminal 72. In the drawing the terminal strip 42 is shown divided into a plurality of individual strip sections 42a each having one left hand terminal 70, one right hand terminal 72, an upper central terminal 74, and a lower central terminal 76. Each section 42a corresponds to one switch position and is adapted to be connected to one or more switches in parallel. Also each strip section 42a is associated with a relay such as the relays 36, 38 and 40 and is connected to the coil sides of the relays by leads such as leads 78, 80 and 82.

The uppermost strip section 42a of the strip 42 (FIG. 2) is shown connected up with its terminal 70 connected to one side of the transformer secondary winding 60 by lead 67 and also to the common side of the relay control coil (not shown) by lead 80. The opposite end of the relay coils are connected by the leads 78 and 82 to the terminals 74 and 76 respectively. The terminals 74 and 76 are also connected by leads 84 and 86 respectively to terminals 88 and 90 respectively on one or more switches 92 in parallel as shown. The switches 92 also have terminals 94 which are connected together and to movable switch blades inside the switches 92 (not shown). The switch blades are moved when the switch is operated between positions closing a circuit with one of the terminals 88 or 90 but are spring restored to neutral positions. The switch terminals 94 are also connected by lead 96 to the associated terminal 72 on the strip section 42a, and from there via the lead 69 to the opposite side of the transformer secondary winding 60. It is also anticipated to construct the strips 42 and 44 of one piece instead of having separate sections such as the sections 42a and 44a.

A typical switch 92 is shown in FIG. 3 in which the operator member 98 is pivoted at its center and can be pressed on either end to energize a different portion of the relay coil for opening or closing the relay contacts. When pressure is released the member 98 returns to a neutral inoperative position.

The complete circuit for energizing the relay 36 is as follows: from the input leads 46 and 48 to the primary winding 54 of the transformers 24, through the transformer 24 to the secondary winding 60, then by lead 67 to the terminals 70, through lead 80 to the common side of the relay coils, then by either lead 78 or 82 depending on which side of the operator 98 is pressed to the associated switch terminal 88 or 90, through the closed movably switch blade to the terminal 94 and via lead 96 to terminal 68, and to the opposite side of the transformer secondary winding 60. It is now apparent that when either side of the switch member 98 is pressed a circuit is established which energizes one of the relay coils to open, or close, the relay contacts. It is also apparent that only the secondary transformer voltage is present in the right side of the box 10, and this voltage is preferably selected to be relatively low, of the order of 24 volts for example, so that it can be handled and even touched without danger. This same low voltage is also fed to all of the switches 92 and therefore high voltage wiring is eliminated to all switches in the system. This to a great extent eliminates a potential fire hazard and makes the system safer to use and to repair.

The terminal strip 44 in the high voltage chamber is similar to the strip 42 and has three rows of terminals. The left row of terminals 100 are connected together by a lead 102 behind the strip 44 and are also connected to the power input terminal 52. The right row of terminals 104 are connected together by a plurality of removable jumpers 106, and are connected to the power input terminal 50. The jumpers 106 are employed to enable separating the terminals 104 into groups of one or more to enable the terminals and appliances fed thereby to be arranged in separately fused circuits. Any number of separately fused circuits can be provided simply by removing a suitable number of jumpers 106. In the circuit shown in FIG. 2, two of the jumpers 106 are shown disconnected to illustrate how the circuits can be separated. Removing the jumpers, as shown, provides three separate circuits each of which is connected to a different input power lead, one consisting of the bottom connected terminals 104, one consisting of the single terminal 104 between the two disconnected jumpers 106, and a third extending from the upper disconnected jumper 106 to the top of the strip 44.

A third row of terminals 108 is also provided in the center of the high voltage strip 44 for reasons which will be shown hereinafter, and the high voltage terminal strip 44, like the low voltage strip 42, is divided into a plurality of strip sections 44a, each being under control of a different relay.

When the switch 92 associated with the relay 36 is pressed to the position closing the associated relay contacts, a circuit is established to a particular associated piece of equipment, such as a light bulb or appliance. The circuit to the appliance is from the input lead 48 to the terminal 52, then via the lead 102 to the upper left hand terminal 100, through lead 110 to and through the appliance and back on lead 112 to terminal 108, from terminal 108 through lead 114 to the relay switch portion 36b, through the now closed relay switch contacts, and from there via lead 116 to the associated terminal 104 and jumpers 106 to the opposite power input lead 118 (which is similar to the lead 46, but separately fused). When the switch 92 is pressed in the opposite direction, the other portion of the relay coil is energized to open the relay contacts and de-energize the appliance.

The relays 38 and 40 operate similarly to the relay 36 and are included for illustrative purposes only. Obviously, more of the knockouts 34 in the central wall 26 can also be provided with a relay as needed. Also a plurality of knockouts 120 are provided in the right hand wall 16 and are used, as needed, for additional switches, and a plurality of knockouts 122 are provided in the left wall 14 to provide locations for the entrance of additional separately fused power leads and for connections to additional controlled output circuits.

Thus it is apparent that there has been shown and described an electric terminal and control box for a dual voltage electric system which fulfills all of the objects and advantages sought therefor. Briefly, the device comprises a housing with transformer means mounted therein, separate high and low voltage means in said housing, said high voltage means including terminal means, relay switch means, and circuit means adapted to be connected to the primary side of the transformer means and to appliances to be controlled, and said low voltage means including terminal means, relay control means, switch means, and circuit means adapted to be connected to the secondary side of the transformer means, said low voltage means also including connections to switch means which energize the relay means and control the high voltage means.

Many changes, variations, and modifications of the present device will be readily apparent to those skilled in the art. All such changes, variations and modifications which do not depart from the spirit and scope of the invention are deemed to be covered by the invention which is limited only by the claims which follow.

I claim:

1. An electric distribution device for distributing electric energy at a plurality of voltage levels comprising a closed container with a removable cover on one side, wall means mounted in the container dividing the interior thereof into separate compartments on opposite sides thereof, one of said compartments being for relatively high voltages and the other for relatively low voltages, means on said wall means for mounting at least one electrical device having relatively high and relatively low voltage connections, said connections being located respectively in the high and in the low voltage compartments, a transformer mounted in one of said compartments, said transformer having a plurality of high and low voltage connections, a first terminal strip having a plurality of spaced connector terminals mounted thereon positioned in the high voltage compartment, a second terminal strip having a plurality of spaced connector terminals mounted thereon positioned in the low voltage compartment, means connecting preselected ones of said connector terminals on said first terminal strip together and means connecting preselected ones of said connector terminals on said second terminal strip together to provide groups of common connected terminals on each of said strips, means connecting different ones of the terminals on the high voltage terminal strip to selected ones of the high voltage transformer connections, and means connecting different ones of the terminals on the low voltage terminal strip to different ones of the low voltage transformer connections, the high voltage connections of said electrical device being connected to preselected terminals on the high voltage terminal strips, and the low voltage connections of said device being connected to preselected terminals on the low voltage terminal strip.

2. The electric distribution device defined in claim 1 wherein said wall means are slidably mounted in the closed container, and means for cushioning said wall means to eliminate noise and vibration.

References Cited by the Examiner

UNITED STATES PATENTS

| 2,951,185 | 8/60 | Buck | 317—101 |
| 2,976,510 | 3/61 | Blain | 317—101 |
| 3,001,102 | 9/61 | Stiefel | 317—101 |
| 3,025,432 | 3/62 | Giegerich | 317—99 |

OTHER REFERENCES

G.E. Publication, "Remote Control Wiring System."

JOHN F. BURNS, *Primary Examiner.*

MILTON O. HIRSHFIELD, ORIS L. RADER, E. JAMES SAX, *Examiners.*